Patent Number: 4,510,275
Date of Patent: Apr. 9, 1985

United States Patent [19]
Ihikura et al.

[54] NOVEL AQUEOUS COATING COMPOSITION

[75] Inventors: Shinichi Ihikura, Kyoto; Kazunori Kanda, Yao; Toshiharu Nakaya, Kyoto, all of Japan

[73] Assignee: Nippon Paint Co., Ltd., Osaka, Japan

[21] Appl. No.: 396,864

[22] Filed: Jul. 9, 1982

[30] Foreign Application Priority Data

Jul. 21, 1981 [JP] Japan ................. 56-114686

[51] Int. Cl.³ .............................. C08L 63/00
[52] U.S. Cl. .................... 523/412; 524/503; 524/507; 524/510; 524/512; 524/513; 524/520; 524/522; 524/523
[58] Field of Search ......... 524/507, 510, 512, 513, 524/503, 522, 523, 520; 523/412/

[56] References Cited

U.S. PATENT DOCUMENTS

| | | | |
|---|---|---|---|
| 3,356,627 | 12/1967 | Scott | 524/523 |
| 4,069,186 | 1/1978 | Ramig | 524/522 |
| 4,131,711 | 12/1978 | Attwood | 524/520 |
| 4,220,575 | 9/1980 | Wallace | 524/512 |
| 4,277,385 | 7/1981 | Carroll | 524/522 |
| 4,283,320 | 8/1981 | Carroll | 524/522 |
| 4,337,183 | 6/1982 | Santiago | 524/507 |
| 4,377,661 | 3/1983 | Wright | 524/522 |

*Primary Examiner*—Paul R. Michl
*Attorney, Agent, or Firm*—Wenderoth, Lind & Ponack

[57] ABSTRACT

An aqueous coating composition comprising, as film-forming components, at least one water soluble resin and at least one water-insoluble finely pulverized resin, one of said water soluble resins having certain specified tolerance and surface tension properties. This coating composition is very stable, shows excellent working properties, such durability and exhibits other desirable properties, and is useful as a coating, especially in the automobile industry.

6 Claims, No Drawings

NOVEL AQUEOUS COATING COMPOSITION

FIELD OF INVENTION

The present invention relates to a novel aqueous coating composition having particular rheological properties comprising as film-forming components a water soluble resin and resinous fine powder.

BACKGROUND OF THE INVENTION

Since a coating composition containing an organic solvent has many problems as danger of firing and explosion, being harmful to the human body and is accompanied with a public hazard as an environmental pollutant and the like, recently, the market share is getting reduced and being replaced by aqueous and/or powder coating compositions. However, in a conventional aqueous coating composition, it is essential for the purpose of dissolving or dispersing the vehicle resin in water to introduce a number of hydrophilic groups in the molecule of said resin, to use a quantity of a neutralizing agent capable to form a water-soluble salt, and select to such resin which has comparatively lower molecular weight. Therefore, the coating film performance of such compositions with respect to durability, water resistance or the like is not so good.

Secondly, since it is impossible to formulate an aqueous coating composition with a high non-volatile content, the working properties are not, generally satisfactory. Thirdly, the dispersibility of coloring matter is not very good and the use is rather limited, especially in technical fields which require a higher order of finishing appearance, gloss and sharpness, as in the automobile industry.

An emulsion coating composition whose resin is prepared by the so-called emulsion polymerisation in an aqueous medium, has indeed an advantage in that a considerably higher molecular resin can be utilized, but at the same time, has such problems that the preparation of said resin necessitates an emulsion polymerisation technique of a higher standard, and further the quantity of surfactant or emulsifier added for emulsification purposes causes additional problems of decreased durability and decreased water resistance of the film.

On the other hand, a powder coating composition has its own problems. That is, if the glass transition point is too low, there occurs a blocking phenomenon, which will result in a coating with inferior performance, and necessitates adopting a considerably higher baking temperature and the use of a special applicator which will abstruct the generic use of the coating composition.

A coating composition in which the powder coating is dispersed in water as a slurry has also been well known. This comprises as a main ingredient a powder coating. However, in this type of composition, there are problems such that:

(1) in general, it is difficult to increase the non-volatile content, and therefore, it is difficult to obtain a thicker coating and a satisfactory adhesion of the film to the substrate, and also cracks occur easily in the film;

(2) it is difficult to obtain an appropriate viscosity and fluidity necessary for the coating by means of, for example, spraying, and thus, there is a problem of working with the coating, and moreover such coating is deficient in gloss, too (3) there is a tendency towards sedimentation and separation of solid matters in the coating composition while storing said composition; and (4) since a dispersing agent is generally used, there are problems in the performance of the film in regard to water resistance and the like.

Among them, poor working properties are the most troublesome question, and the slurry compositions have not been practically used at the present time for this reason. Recently, various attempts have been made to overcome the above said drawbacks of the aqueous dispersion type coating composition. The most attractive one is to add to an aqueous slurry of a powder coating, a water soluble or water dispersible resin as a modifier. For example, in Japanese Patent Application Nos. 31636/76 and 25224/76, a water dilutable resin in quantity of 0.5–30 wt % or resin particles is added, together with 0.05–30 wt % coloring matter, to a composition comprising 90 to 30 parts by weight of an aqueous medium and 10 to 70 parts by weight of resin particles having a softening point of 5° to 120° C. and a mean diameter of 0.5 to 80μ, to improve the storage stability of the composition, and in Japanese Patent Application No. 127151/74, is shown a composition comprising 50–80% by weight of powdered resin and 20–50% by weight of water, compounded with 0.05 to 5 parts by weight of surfactant and 5 to 50 parts by weight of water soluble or water dispersible resin per 100 parts by weight of said powdered resin. Each of the disclosed compositions comprises a water insoluble powder resin as a main ingredient, and the water soluble or water dispersible resin is no more than an additive, and hence, they all belong to a category of aqueous dispersion type composition. Also, Japanese Patent Application Nos. 74606/79 and 17062/79 each claims a water dispersion type coating composition containing, as main ingredients, a powder coating and a carboxyl bearing water soluble resin, the weight ratio of solid matters of said powder coating and water soluble resin being in the range of 0.1 to 100. However, in the embodied examples, the content of water soluble resin is about 10 to 20% of the powdered resin and thus, the water soluble resin is no more than a dispersion stabilizer in a water-powdered resin dispersion system. The same is true in the case of Japanese Patent Publication No. 4149/80 claming an aqueous dispersion coating composition comprising at least two water insoluble resinous powders and one or more than two water soluble resins. So far as an aqueous dispersion coating is concerned, there is always the troublesome question of the dispersion stability of the powder. Therefore, various attempts have been made to use finely pulverized resinous powder or dispersion aids. However, since the heretofore known techniques have been developed on the assumption that if the powder is surrounded by a water soluble resin, the dispersion stability would be improved because of the affinity of the water soluble resin to the aqueous medium, it is of not surprising that the ratio of the water soluble resin is rather limited as compared with that of the powered resin.

As the results of our extensive studies on the technique for increasing, in an aqueous coating composition comprising a water soluble resin dissolved or dispersed in water, the content of resin, without increasing the viscosity thereof, the inventors have found that by the selective use of certain type of water soluble resin, even if a higher concentration of pulverized resin is presented in the system, there is no undesirable increase in the viscosity and the thus obtained mixture is very stable for a longer period of time because of its specific rheological properties. Further, even in the absence of a surfactant or a dispersing agent, there is no sedimentation and separation of the solid matter in the composition and no coagulation of the resin in the coating, and it is very easy to obtain a thicker coating which, after curing, will give an excellent film having improved durability and other desirable characteristics. On the basis of these findings, the inventors have completed the invention. Therefore, the present coating composition is a novel aqueous composition having particular rheological properties and comprising a pulverized resin dispersed in a water-water soluble resin system, and should not be confounded with an aqueous dispersion comprising a water-powder resin dispersion system with a water soluble resin as a modifier.

SUMMARY OF THE INVENTION

The gist of the invention resides in an aqueous rheological coating composition comprising an aqueous medium and, as film-forming components, (A) one or more than 2 water soluble resins, and (B) fine powders of one or more than 2 water insoluble resins, the weight ratio of solid matters of said (A)/(B) being 98/2—45/55, and at least one of said water soluble resins fulfilling the requirements:

(1) that the water tolerance, expressed in terms of the water dilution multiplicand of the water soluble resin for the solution incapable of reading out the defined type in the test wherein 5 g of aqueous varnish having a common viscosity usually employed in the manufacture of a coating composition are correctly weighed in a 100 ml beaker, diluted with an increasing amount of deionized water, and a No. 1 type (26 point type), which is read through the said beaker, is more than 4, and (2) that the surface tension of the solution obtained by dissolving the above said aqueous varnish with deionized water to 1 wt % solid content, is less than 51 dyne/cm.

DESCRIPTION OF THE PREFERRED EMBODIMENTS

The water soluble resin used in the present invention is any of the members customarily used in a water soluble type coating composition and may be one or more than two resins such as alkyd, polyester, maleic oil, maleic polyalkadiene, epoxy, acrylic, urethane, aminoplast resins and the like. They must be soluble with each other and with the pulverized resins, but may be free to interact with each other at elevated temperatures. That is, the water soluble resin, may or may not carry functional group(s) capable of reacting, at the time of heating, with that(those) of other water soluble resins and-/or the powdered resin. Typical examples of such groups capable present in the water-soluble resin and which can react with the functional groups of other water soluble resins and/or powdered resins are carboxyl groups, sulfonic acid groups, phosphoric acid groups, hydroxyl groups, oxirane groups, active methylol groups, amino groups reactive carbon-carbon unsaturation, isocyanate groups, blocked isocyanate groups, halogen and the like. They are easily incorporated, according to generic methods relating to the selection of monomers, the control of polymerisation reaction and the like, in the molecule of said resin, as required. Carboxyl, sulfonic acid, hydroxyl and amino groups may be introduced into the resin just for solubilization purpose only, as well.

More specifically, a carboxyl group can be incorporated into the resin, by the reaction of a polybasic acid and polyalcohol in the molecule of an alkyd or polyester resin, by the treatment of a drying oil (e.g. linseed oil, castor oil, soybean oil, tung oil) with a maleic anhydride in the molecule of maleic oil resin, by the treatment of polybutadiene, isoprene or polycyclopentadiene with an unsaturated carboxylic acid as a maleic anhydride, fumaric acid and itaconic acid in a maleic polyalkadiene resin. In an epoxy resin, an epoxy group may be introduced by the reaction typically embodied by the combination of bisphenol A and epichlorohydrin, and basic or acidic group(s) may be introduced into a part or whole of the oxirane groups. In an acrylic resin, by the polymerisation of appropriate monomers selected from α, β-unsaturated carboxylic acids (as acrylic acid, methacrylic acid, cinnamic acid, crotonic acid, fumaric acid, citraconic acid, maleic anhydride), acrylic esters (as methyl-, ethyl-, propyl-, butyl-, hexyl-, and lauryl-ester), methacrylic esters (as methyl-, ethyl-, propyl-, butyl-, hexyl-, and lauryl ester), acrylamides, methacrylamides, acrylonitrile, glycidyl acrylates, allyl alcohol and the like, may be freely introduced a functional group such as a carboxyl group, hydroxyl group, amino group or the like. In a similar way, a functional group for solubilization or for reaction purposes may be easily introduced in urethane and aminoplast resins. For the solubiliaztion of a water soluble resin bearing acidic group(s) as carboxyl, said acidic group(s) may be neutralized, according to normal procedures, with a basic material as, for example, monomethylamine, dimethylamine,, trimethylamine, monoethylamine, diethylamine, triethylamine, monoisopropylamine, diisopropylamine, diethylenetriamine, triethylenetetramine, monoethanolamine, diethanolamine, triethanolamine, monoisopropanolamine, diisopropanolamine, dimethylethanolamine, morpholine, methyl morpholine, piperazine, ammonia, sodium hydroxide, potassium hydroxide, and lithium hydroxide. Solubilization of such resins having basic group(s) as amino groups, may be carried out by effecting neutralization, according to normal procedures, with an acidic substance, such as hydrochloric acid, sulfuric acid, nitric acid, acetic acid, formic acid and lactic acid.

As the combination of functional groups capable of reacting with each other between or among the water soluble resins, or between the water soluble resin and the powdered resin, or between the powdered resins, mention is made of the combination of a carboxyl group and an epoxy group; a carboxyl group and a hydroxyl group; a hydroxyl group and an epoxy group; a hydroxyl group and a blocked isocyanate group; an epoxy group and an amino group; a hydroxyl group and a methylol group; a hydroxyl group and an etherified methylol group, or the like. However, the invention is not limited to the above, and any combination of radicals capable of reacting with each other at elevated temperatures may successfully be used.

In this invention, one or more than two of the above-mentioned water soluble resins are used as film-forming components and as a medium for the pulverized resin, in the form of an aqueous varnish. However, at least one of said water soluble resin must fulfil the requirements that its water tolerance, whose definition is hereinunder stated, is more than 4 and the surface tension of a 1 wt % aqueous solution (solid content) of such resin is less than 51 dyne/cm. When an aqueous varnish having a normal range of viscosity usually employed for the manufacture of a coating composition, in other words having as much as 20 to 50% nonvolatile contents, is diluted with an increasing amount of water, the solubility of the resin is decreased rather than increased with the increase in dilution water, after reaching its maximum solubilization point, and the resin solution begins to lose its transparency and is turned to a turbid liquid. Water tolerance is a kind of measure for evaluating said dilution limit of the water soluble resin and is expressed in terms of the water dilution multiplicated of the resin for the solution incapable of reading out the defined type in a test wherein 5 g of said aqueous varnish are correctly weighed in a 100 ml beaker, diluted with an increasing amount of deionized water, and No. 1 type (26 point type) is read through said beaker. The inventors, while studying the rheological properties of the dispersion of the pulverized resin in a water soluble resin varnish, have found that there are certain correlations among the water tolerances and surface tension of various water soluble resin varnishes, as well as the dispersion stability of the pulverized resin and the fluid viscosity of thus obtained mixture, and that a coating composition having an improved dispersion stability and excellent working properties can only be obtained with a water soluble resin that fulfils the requirements that the above said water tolerance is more than 4 and that the suface tension of a 1 wt % aqueous solution is less than 51 dyne/cm. The reasons why the above said requirements of the water soluble resin do have a close connection with the properties of the resin composition are not clearly been known at the present time. However, when the water tolerance is under 4, there is a trend for the viscosity of the final coating composition to become high and the dispersion stability worsens. Similar tendencies are clearly observed when the surface tension exceeds the limit of 51 dyne/cm.

It looks like the weight ratio of the hydrophilic functional and the average molecular weight of the water soluble resin may have some influence on the properties of the coating composition and on the film performance, but they are not conclusive conditions and hence, are to be taken as desirable requirements in the present invention. That is, according to the inventors' studies, it has been found that the water soluble resin should preferably have 0.3 to 5 m mol/g, most preferably 0.5 to 4 m mol/g, of hydrophilic functional groups (e.g. carboxyl groups, sulfonic acid groups, phosphoric acid groups, hydroxyl groups, active methylol groups, amino groups), and preferably 500 to 20,000, most preferably a 700 to 5,000 average molecular weight. It should, however, be kept in mind that they are no more than supplemental and desirable requirements for obtaining a more preferable coating composition in respect to the viscosity of the composition, the dispersion stability of the pulverized resin and the coloring matter, and film-performances as to durability, coating smoothness and the like, and can never be critical conditions for the intended objects of producing a coating composition having excellent working properties, improved storage stability and increased water resistance of the film.

The water soluble resins fulfilling the above said requirements of water tolerance and surface tension can be used singly or in the combination of two or more; and, however, in the present invention, additional water soluble resins not fulfilling the abovesaid requirements may be used together providing that at least one of the water soluble resins of the former type is presented in the system. These additional water soluble resins may or may not react with the above said resin, and hence, with respect to the presence or absence of functional groups, it s totally free. Examples of appropriate combinations of such functional groups, if any, are hydroxyl groups and acidic groups (especially carboxyl groups); hydroxyl groups and blocked isocyanate groups; active methylol groups and hydroxyl groups; active methylol groups and carboxyl groups; oxirane groups and amino groups; oxirane groups and carboxyl groups; reactive carbon-carbon unsaturations, or the like. Particular preference is given to the combinations of active methylol groups and hydroxyl groups; and active methylol groups and carboxyl groups, and examples of such combinations are melamine resins and alkyd resins, acrylic resins or maleic resins. At this time, the weight ratio of these functional groups capable of reacting with each other, is preferably selected in a range of 1:10 to 10:1. The amount of said additional water soluble resin should preferably be less than 85% by weight, most preferably less than 60% by weight, of the total amount of the water soluble resins contained, and by the adoption of this requirement, it is possible to attain a further improvement in the film performance of solvent resistance and the like.

The finely pulverized resins used in the present invention are insoluble in water, solid at room temperature, and when heated, compatible with water soluble resins and with other pulverized resins, if any. Therefore, these resinous powders are usually made of such resins which have a softening point of 5° to 120° C., preferably 40° to 80° C. and which are insoluble in water as, for example, acrylic resins, epoxy resins, polyester resins, alkyd resins, amine modified resins, phenol resins, urea resins, melamine resins, olefinic resins, polyvinyl chloride resins, polyvinylacetate resins and the like. As to the mean diameter of said resinous powders, there is no particular limit on it, and any powders dispersiable in a water-water soluble resin system may satisfactorily be used. However, said diameter is, in general, in a range of 0.5 to 500$\mu$. Such pulverized resin may or may not carry functional group(s) capable of reacting, when heated, with those of the water soluble resins or those of other pulverized resins. Thus, in the present invention, the presence or the absence of functional group(s) is only optional in both the water soluble resins and in the pulverized resins, and therefore, it will easily be understood that the present resinous composition comprising water soluble resins and pulverized resins are thermoplastic or thermosetting in nature as a whole. When both of the water soluble resin and pulverized resin are thermoplastic and do not carry at least two functional groups capable of reacting with each other, the thus formulated resinous composition is of course thermoplastic. When there are at least two functional groups capable of reacting with each other, the composition is thermosetting. The curing reaction at an elevated temperature in the latter case may occur between the pulverized resin and water soluble resin, mutual pulverized resins, and mutual water soluble resins, or between all of the resins contained in the system. It is also possible to make present in the resinous powder, a low molecular compound having (a) reactive functional group(s) and make use of said functional group(s) for the curing reaction. Therefore, the resinous powder used in the present invention may be composed a water soluble resin alone or a mixture of water insoluble resin and a comparatively lower molecular compound having a functional group which participates in a curing reaction in a heat-melted state (hereinafter called as low molecular compound), and the latter may be insoluble or soluble in water. As a functional group capable of being presented in said pulverized resin or low molecular compound in the powder, mention is made of, for example, a carboxyl group, a sulfonic acid group, a phosphoric acid group, a hydroxyl group, an active methylol group, an oxirane group, an amino group, an amide group, an isocyanate group, a blocked isocyanate group, an imidazole group, a triazole group, and a cyano group. Examples of powdered resins bearing such functional groups are acrylic, epoxy, saturated polyester, unsaturated polyester, alkyd, oil-free alkyd, phenol, polyether, polyolefinic, polyalkadiene, vinyl, polyamide, and polycarbonate resins, fluorine plastic resins, and amino resins, and examples of said low molecular compounds are blocked isocyanates, acid anhydrides, imidazoles, dicyandiamides, and polycarboxylic acids. However, they are only typical examples useable in the invention, and should not be taken as being limiting in any senses. The above said functional groups are appropriately grouped in the combinations of, for example, carboxyl groups and epoxy groups; carboxyl groups and hydroxyl groups; and hydroxyl groups and methylol groups, and are reacted with each other, as already stated, in connection with those of the water soluble resins.

In the present invention, it is of course possible to formulate the composition such that there is only one functional group in either the water soluble resin or the pulverized resin, or even if there are more than 2, they are less reactive with each other. In such cases, the formed coating only resides in a thermoplastic state or in a very weakly cured state. However, from the standpoint of the solid state properties of the coating, as to water resistance, durability, solvent resistance and the like, it is preferred to have at least 2 reactive functional groups present in the coating composition, thereby making the same into a heat curable type composition. Therefore, in a particularly preferable embodiment of the present invention, wherein the resinous powder is composed of the above said resin or the combination of said resin and said low molecular compound and two and more of different types of such resinous powders are presented so that the functional groups located on said resins or the low molecular compounds can be reacted with each other when heated, thereby effecting condensation, addition, ring-opening reactions or the like. The said resinous powders are preferably prepared by the combination of, for example, hydroxyl bearing polyester resins and blocked isocyanates; carboxyl bearing polyester resins and epoxy resins; hydroxyl bearing acrylic resins and blocked isocyanates; carboxyl bearing acrylic resins and epoxy resins; oxirane bearing acrylic resins and dicarboxylic acids and/or dicyandiamide; epoxy resins and dicyandiamide and/or dicarboxylic acids and, the like. Furthermore, in the most preferable embodiment, the weight ratio of said mutually reactive functional groups is selected in a range of 1:10 to 10:1, thereby holding some of the functional groups for reaction with the water soluble resins.

In another embodiment, wherein a water soluble resin and pulverized resin are selected so that they can be reacted with each other, the following are preferably used: hydroxyl bearing alkyd resins and blocked isocyanates and/or aminoplast; carboxyl bearing alkyd resins and epoxy resins and/or aminoplast; hydroxyl bearing acrylic resins and blocked isocyanates and/or aminoplast; carboxyl bearing acrylic resins and epoxy resins and/or aminoplasts; and carboxyl bearing modified maleic oils and epoxy resins and/or aminoplasts. However, the resinous substances used for the present water soluble resin, pulverized resin or combination thereof is not limited to the above mentioned members only, and may be freely selected from the known materials by those skilled in the art insofar as they come within the scope of the appended claims.

In the present coating composition, it is essential to use the above said water soluble resin and the pulverized resin in a weight ratio, expressed in terms of solid contents, of 45 to 98% by weight, preferably 50 to 80% by weight of the former and 55 to 2% by weight, preferably 50 to 20% by weight, of the latter.

As a medium, use is made of water, but the weight ratio of water medium to resinous components can be freely changed in a wider range. That is, water soluble resin is, in general, prepared by dissolving a resin in a hydrophilic solvent, adding a neutralizer to make it water soluble, and the thus obtained mixture is used, as it is, or after dilution with water, in a liquid state. The present invention has been made on the basis of such finding that when the pulverized resin is added, in an amount specified (in terms of solid content), to thus obtained liquid form of the water soluble resin, that resin is kept in well dispersed state in the mixture for a longer period of time because of the particular rheological properties of said mixture, without causing any undesirable increase in viscosity, and such properties can never be deteriorated even if the mixture is diluted with water to the extent involved in forming a normal aqueous paint composition. Therefore, water can be presented in the present coating composition in any amounts within the limit necessitated by the final form of the coating composition, and the weight ratio of water to resinous components may be freely changed within the limits of application purposes, application area, and the application form of the present composition. Since an aqueous paint is customarily used in a solid content of 10 to 80% in spraying, 1 to 60% in dipping and 5 to 90% in brushing, the amount of aqueous medium and solid contents are advantageously selected in the above mentioned ranges. It is, however, pointed out that since a coating composition is preferably stored in a considerably higher concentration and diluted with water to an appropriate concentration just prior to the application thereof, the present composition may preferably be formulated in such a way, and that depending on the application purpose, it may be formulated in a considerably lower resinous content with or without adding other additives thereto.

When the weight ratio of the said water soluble resin to the pulverized resin, in terms of solid contents, is outside the above mentioned range, one is unable to obtain a stable composition with optimum rheological properties as desired for a coating. For example, if the content of water soluble resin is too low, it will cause deterioration of the dispersion stability of the pulverized resin and will damage the leveling properties of the coated film, and if the amount of water soluble resin is too high, it will cause an excessive increase in the viscosity of the composition, thereby giving rise to a decrease in water resistance of the coated film.

The coating composition of the present invention comprises essentially an aqueous medium, and however, may also include hydrophilic, polar, or organic solvents, if desired. Examples of such organic solvents are ethylene glycol monomethyl ether, ethylene glycol monoethyl ether, ethylene glycol monobutyl ether, methanol, ethanol, isopropyl alcohol, n-butyl alcohol, sec-butyl alcohol, t-butyl alcohol, dimethylformamide and the like. In addition to the above mentioned essential components, the present coating composition may include coloring matter. Since the present composition per se has specific rheological properties and is excellent from the standpoint of making a stable dispersion of pulverized resin and coloring matter, there is no need of using a surfactant, a dispersing agent, a modifier or the like. However, these additives may be added, if desired. The preparation of the present coating composition can be carried out in any conventional way. For example, in the preparation of colored coating composition, coloring matter is first added with a part of the water soluble resin to make a color paste, to which are added the remaining parts of the water soluble resin, the pulverized resin(s) and other additives, if any, and the whole is stirred well by using a known mixing device as gate mixer, a high speed disper or the like. It is of course possible to add all of the component members at the outset to a dispersing device and effect a formation of a uniform dispersion in a single operation.

The coating composition of the present invention may be applied with or without dilution water, by a conventional coating technique as by spraying, dipping, brushing and the like, and then subjected to drying or heat-curing as usual.

Thus, the coating composition of the present invention is quite prominent, among other type of known compositions, including aqueous dispersion type coatings, aqueous paint and powder coatings, due to the particular rheological properties, and is very useful in that it is totally free from the drawbacks possessed by the known coatings and is capable of giving excellent working properties, dispersion stability, water resistance and solvent resistance that have never been attained with heretofore known dispersion type coatings.

The invention shall be now more fully explained in the following Examples and Comparative Examples. Unless otherwise being stated, the term "part" represents "part by weight".

EXAMPLE 1

Preparation of resinous fine powder (1)

| FINEDIC M6102[1] | 900 parts |
|---|---|
| Crelan[2] | 150 parts |
| Rutile type titanium dioxide | 110 parts |

[1]Polyester resin manufactured by Dainippon Ink Co., Ltd. Tm 100° C., Hydroxyl value 30, Acid value 9
[2]Blocked isocyanate manufactured by Bayer A. G.

The above said mixture was heat-melted in a heating mixer, allowed to cool, and then subjected to a grinder at a room temperature to obtain fine powder (1) with a maximum diameter of 45μ.

Preparation of coating composition (1)

| Water soluble resin (1) (maleic polybutadiene resin varnish[3]) | 300 parts |
|---|---|
| Resinous fine powder (1) | 70 parts |
| Rutile type titanium dioxide | 140 parts |
| Deionized water | 90 parts |

[3]Polyoil 110(1,4-polybutadiene resin manufactured by Huels) modified with maleic anhydride
Water tolerance more than 10; surface tension 50 dyne/cm*; Acid value 90; Neutralization ratio 80%; Solid content 30% by weight; Number-average molecular weight 1300
*determined by using CB-VP type surface tension balance manufactured by Kyowa Kagaku Sha, with 1 wt % (solid content) solution The above said mixture was placed in a 1 liter stainless steel vessel and stirred well by using a paint conditioner at room temperature for 30 minutes to obtain a white colored composition (1). After keeping it at a room temperature for 2 months, the composition showed no sedimentation and thus, the dispersion stability was excellent.

EXAMPLES 2 to 13 and COMPARATIVE EXAMPLES 1 to 5

Resinous fine powders (2) to (14) were prepared by using the same method as stated in Example 1, with the resins and low molecular compounds shown in Table 1, respectively.

M-6102: FINEDIC M 6102
M-6107: Polyester resin manufactured by Dainippon Ink Co., Ltd. Tm 110° C.; Hydroxyl vale 0; Acid value 55
RD-6360: Acrylic resin manufactured by Mitsui Toatsu Kagaku K.K. Epoxy equivalent 473
Ep-1004: Epoxy resin manufactured by Shell Chem. Co. Epoxy equivalent 950
Ep-1007: Epoxy resin manufactured by Shell Chem. Co. Epoxy equivalent 1850
DDA: 1,10-decanedicarboxylic acid
DCDA: Dicyandiamide
HMMM: Crystalline hexamethoxymethylol melamine;
$TiO_2$: Rutile type.

TABLE 1

| Resin fine powder No. | M-6102 parts | M-6107 parts | RD-6360 parts | Ep-1004 parts | Ep-1007 parts | Crelan parts | DDA parts | DCDA parts | HMMM parts | $TiO_2$ parts |
|---|---|---|---|---|---|---|---|---|---|---|
| (2) | 900 | — | — | — | — | — | — | — | — | 100 |
| (3) | — | 900 | — | — | — | — | — | — | — | 100 |
| (4) | — | — | 900 | — | — | — | — | — | — | 100 |
| (5) | — | — | — | 900 | — | — | — | — | — | 100 |
| (6) | — | — | — | — | 900 | — | — | — | — | 100 |
| (7) | 900 | — | — | — | — | 80 | — | — | — | 120 |
| (8) | — | 500 | — | 500 | — | — | — | — | — | 120 |
| (9) | — | — | 900 | — | — | — | 100 | — | — | 120 |
| (10) | — | — | — | — | 800 | — | — | 200 | — | 120 |
| (11) | 900 | — | — | — | — | — | — | — | 100 | 120 |
| (12) | — | 900 | — | — | — | — | — | — | 60 | 120 |
| (13) | — | 700 | — | — | 100 | — | — | — | 100 | 120 |

TABLE 2

| Exam. No. | Resin fine powder (parts) | | | | | | | | | | | |
|---|---|---|---|---|---|---|---|---|---|---|---|---|
| | (2) | (3) | (4) | (5) | (6) | (7) | (8) | (9) | (10) | (11) | (12) | (13) |
| 2 | 120 | — | — | — | — | — | — | — | — | — | — | — |
| 3 | — | 60 | — | — | — | — | — | — | — | — | — | — |
| 4 | — | — | 42 | — | — | — | — | — | — | — | — | — |
| 5 | — | — | — | 15 | — | — | — | — | — | — | — | — |
| 6 | — | — | — | — | 70 | — | — | — | — | — | — | — |
| 7 | — | — | — | — | — | 60 | — | — | — | — | — | — |
| 8 | — | — | — | — | — | — | 60 | — | — | — | — | — |
| 9 | — | — | — | — | — | — | — | 70 | — | — | — | — |
| 10 | — | — | — | — | — | — | — | — | 15 | — | — | — |
| 11 | — | — | — | — | — | — | — | — | — | 40 | — | — |
| 12 | — | — | — | — | — | — | — | — | — | — | 60 | — |
| 13 | — | — | — | — | — | — | — | — | — | — | — | 100 |
| Comparative Examples No. | | | | | | | | | | | | |
| 1 | — | 60 | — | — | — | — | — | — | — | — | — | — |
| 2 | — | — | — | 15 | — | — | — | — | — | — | — | — |
| 3 | — | — | — | — | 3 | — | — | — | — | — | — | — |
| 4 | 70[1] | — | — | — | — | — | — | — | — | — | — | — |
| 5 | — | — | — | — | — | — | — | — | 40 | — | — | — |

| Exam. No. | Water Soluble resin (parts) | | | | | | | | | | TiO₂ (parts) | deionized water (parts) |
|---|---|---|---|---|---|---|---|---|---|---|---|---|
| | (1) | (2) | (3) | (4) | (5) | (6) | (7) | (8) | (9) | (10) | | |
| 2 | — | 486 | — | — | — | — | — | — | — | — | 130 | 60 |
| 3 | — | — | — | 281 | — | — | — | — | — | — | 70 | 75 |
| 4 | — | — | 450 | — | — | — | — | — | — | — | 110 | 80 |
| 5 | — | — | — | 340 | — | — | — | — | — | — | 100 | 40 |
| 6 | — | — | — | — | — | 203 | — | — | — | — | 60 | 60 |
| 7 | — | — | — | — | — | — | 300 | — | — | — | 60 | 40 |
| 8 | — | — | — | — | 300 | — | — | — | — | — | 70 | 30 |
| 9 | 230 | — | — | — | — | — | — | — | — | — | 65 | 45 |
| 10 | — | — | — | — | — | — | 450 | — | — | — | 100 | 50 |
| 11 | — | — | — | — | — | 300 | — | — | — | — | 80 | 60 |
| 12 | — | — | — | — | 250 | — | — | — | — | — | 70 | 50 |
| 13 | — | — | — | 400 | — | — | — | — | — | — | 100 | 70 |
| Comparative Examples No. | | | | | | | | | | | | |
| 1 | — | — | — | — | — | — | — | 231 | — | — | 70 | 75 |
| 2 | — | — | — | — | — | — | — | 340 | — | — | 100 | 40 |
| 3 | — | 486 | — | — | — | — | — | — | — | — | 130 | 60 |
| 4 | — | — | — | — | — | — | — | — | 300 | — | 140 | 90 |
| 5 | — | — | — | — | — | — | — | — | — | 480 | 80 | 60 |

Note:
[1]powder (1)

| No. | Composition | water tolerance | surface tension dyne/cm | Acid value | Hydroxyl value | Neutralization ratio % | Non-volatile content wt % | Molecular weight |
|---|---|---|---|---|---|---|---|---|
| (2) | maleic linseed oil | 4 | 51 | 109 | — | 80 | 37 | 1120 |
| (3) | Rosin modified maleic linseed oil | 10 | 48 | 92 | 20 | 80 | 35 | 1310 |
| (4) | Alkyd resin | 10 | 42 | 55 | 40 | 80 | 40 | 1360 |
| (5) | Polyester resin | 5 | 49 | 15 | 100 | 100 | 45 | 1480 |
| (6) | Acrylic resin | 10 | 42 | 70 | 60 | 100 | 40 | 8200 |
| (7) | Amine modified epoxy resin | 5 | 41 | — | 60 | 100 | 25 | 2220 |
| (8) | Alkyd resin for comparison purpose | 2 | 55 | 16 | 40 | 100 | 30 | 1350 |
| (9) | Maleic polybutadiene for comparison purpose | 3 | 53 | 15 | — | 100 | 30 | 1250 |
| (10) | Acrylic resin for comparison purpose | 2 | 54 | 15 | 60 | 100 | 25 | 4500 |

Coating compositions were prepared according to the method of Example 1, except that the raw materials specified in Table 2 were used.

The coating compositions obtained in Examples 2 to 13 each showed no formation of hard cakes after being left to stand at room temperature for 2 months, but the compositions of Comparative Examples 1 and 2 showed evident sedimentation in 1 week. The original dispersion state could not be restored by the application of vigorous stirring. In each of the Comparative Examples 4 and 5, sedimentation and coagulation of resinous materials were partly observed and only an unstable composition was obtained.

EXAMPLE 14

The coating composition prepared in Example 1 was applied onto a dull steel plate so as to give 30μ dry thickness, and after setting for 30 minutes, the coating was heat-dried at 160° C. for 30 minutes, thereby effecting a three-dimensional cross-linking. The thus obtained coating was very flat and showed 60° gloss of 81. No change was observed in the film even after dipping in warm water (40° C.) for 48 hours. When evaluated working properties of the composition, it was found that the minimum film thickness showing no pinholes was 44μ and the lowest limit giving no sagging was 48μ.

EXAMPLE 15

Baked dry coatings were prepared according to the procedures of Example 14 with the coating compositions of Examples 2 to 13 and Comparative Examples 1 to 5, respectively. Working properties and film performance for the respective composition were shown in Table 3.

Evaluation standards of working properties and of water resistance are as follows: Working properties:

| Mark | film thickness showing no pinholes | film thickness showing no sagging |
|---|---|---|
| ⊚ | more than 50μ | more than 55μ |
| O | 40 to 50μ | 40 to 55μ |
| Δ | 35 to 40μ | 30 to 40μ |
| X | less than 35μ | less than 30μ |

Water resistance
| | |
|---|---|
| O | no change |
| Δ | slight loss of gloss |
| X | severe loss of gloss - peeling |

TABLE 3

| coating composition | working properties | gloss | water resistance |
|---|---|---|---|
| EXAMPLE | | | |
| 2 | O | 75 | O |
| 3 | ⊚ | 82 | O |
| 4 | O-⊚ | 86 | O |
| 5 | ⊚ | 90 | O |
| 6 | O | 88 | O |
| 7 | O-⊚ | 90 | O |
| 8 | O-⊚ | 92 | O |
| 9 | O | 86 | O |
| 10 | O-⊚ | 91 | O |
| 11 | O | 87 | O |
| 12 | ⊚ | 90 | O |
| 13 | ⊚ | 88 | O |
| COMPARATIVE EXAMPLE | | | |
| 1 | X | 51 | X |
| 2 | X | 55 | X |
| 3 | Δ | 87 | X |

Working properties and other data on Comparative examples 4 and 5 were not shown because of failure in obtaining stable compositions.

EXAMPLE 16

After leaving to stand for 30 days, the coating compositions of Examples 1 to 13 each was applied onto dull steel plate as in Example 14. The thus obtained coatings equally showed excellent working properties, gloss and water resistance comparable with those of the compositions of Examples 14 and 15.

EXAMPLE 17

A white colored coating composition was prepared by using the formulas of Example 1 as white coating paste (1), as follows:

Into a 1 liter stainless steel vessel, were placed 400 parts of the coating paste (1) Ond 25 parts of hexamethoxymethylol melamine resin (hereinafter abbreviated as HMMM), and the mixture was stirred at a room temperature for 15 minutes in a Laboratory mixer to obtain a white colored coating composition. This composition, even after being left to stand at room temperature for 2 months, showed no sedimentation, and thus, the dispersion stability was excellent. This illustrates an example of the aqueous coating composition of the present invention comprising at least 2 water soluble resins and pulverized resin, one of said water soluble resin fulfilling the requirements of water tolerance and surface tension as defined in the appended claims.

EXAMPLES 18 to 28 and COMPARATIVE EXAMPLES 6 to 10

The same procedures as stated in Example 17 were repeated except that the resinous powders shown in Table 4 and the prescription given in Table 5 were used. That is, in each case, a coating paste was first prepared with the finely pulverized resin, or water soluble resin, deionized water and titanium dioxide, to which was added HMMM or BI (triethanolamine adduct of hexamethylenediisocyanate, neutralized with acetic acid by 30%; Hydroxyl value 400; solid content 100 wt. %; molecular weight 560) to obtain a coating composition.

No formation of hard cake was observed in the respective compositions of Examples 18 to 28. However, the coating compositions of Comparative Examples 6,7 and 10 showed comparative sedimentation and separation of solid matters in one week and restoration of the original dispersion could not be effected.

EXAMPLE 29

The coating composition obtained in Example 17 was applied onto a dull steel plate so as to give 30μ dry thickness, and after setting for 30 minutes, the coating was heat-dried at 160° C. for 30 minutes, thereby effecting a three-dimensional cross-linking. The thus obtained coating was very flat and showed a 60° gloss of 73. No change was observed in the film after dipping in warm water (40° C.) for 240 hours and even after dipping in coating thinner for 1 hour. When evaluated working properties, it was found that the minimum film thickness showing no pinholes was 42μ and the lowest limit showing no sagging was 47μ.

EXAMPLE 30

Baked dry coatings were prepared according to the method of Example 29, excepting that the coating compositions of Examples 18 to 28 and Comparative Examples 6 to 10 were used, respectively. The working properties and coating film performance of the respective compositions are shown in Table 6. In this Table, the same standards as shown in Example 15 were used for evaluating the working properties and water resistance, and the following for the solvent resistance.

TABLE 4

| resinous fine powder No. | M-6102 parts | M-6107 parts | RD-6360 parts | Ep-1004 parts | Ep-1007 parts | Crelan parts | DDA parts | DCDA parts | TiO$_2$ parts |
|---|---|---|---|---|---|---|---|---|---|
| (14) | 900 | — | — | — | — | 80 | — | — | — |

TABLE 4-continued

| resinous fine powder No. | M-6102 parts | M-6107 parts | RD-6360 parts | Ep-1004 parts | Ep-1007 parts | Crelan parts | DDA parts | DCDA parts | TiO₂ parts |
|---|---|---|---|---|---|---|---|---|---|
| (15) | — | 500 | — | 500 | — | — | — | — | 100 |
| (16) | — | 700 | — | — | 350 | — | — | — | — |
| (17) | — | — | 900 | — | — | — | 100 | — | — |
| (18) | — | — | 800 | — | — | — | 150 | — | 120 |
| (19) | — | — | — | 1000 | — | — | — | 50 | — |
| (20) | — | — | — | — | 800 | — | — | 200 | 100 |
| (21) | — | — | — | — | 700 | — | 300 | — | 100 |
| (22) | 900 | — | — | — | — | 10 | — | — | — |
| (23) | — | 700 | — | — | 30 | — | — | — | — |
| (24) | — | — | 140 | — | — | — | 360 | — | — |

TABLE 5

| Ex. No. | \multicolumn{12}{c}{Resinous fine powder (parts)} |
|---|---|---|---|---|---|---|---|---|---|---|---|---|
| | (1) | (14) | (15) | (16) | (17) | (18) | (19) | (20) | (21) | (22) | (23) | (24) |
| 18 | — | 120 | — | — | — | — | — | — | — | — | — | — |
| 19 | — | — | 41 | — | — | — | — | — | — | — | — | — |
| 20 | — | — | — | — | — | 42 | — | — | — | — | — | — |
| 21 | — | — | — | 15 | — | — | — | — | — | — | — | — |
| 22 | — | 60 | — | — | — | — | — | — | — | — | — | — |
| 23 | — | — | — | — | 15 | — | — | — | — | — | — | — |
| 24 | — | 60 | — | — | — | — | — | — | — | — | — | — |
| 25 | 66 | — | — | — | — | — | — | — | — | — | — | — |
| 26 | — | — | — | — | — | — | 15 | — | — | — | — | — |
| 27 | — | — | — | — | — | — | — | 41 | — | — | — | — |
| 28 | — | — | — | — | — | — | — | — | 66 | — | — | — |
| Comparative examples No. | | | | | | | | | | | | |
| 6 | — | — | 41 | — | — | — | — | — | — | — | — | — |
| 7 | — | — | — | — | — | — | — | — | — | — | — | 15 |
| 8 | — | — | — | — | — | — | — | 20 | — | — | — | — |
| 9 | — | 3 | — | — | — | — | — | — | — | — | — | — |
| 10 | — | — | — | — | — | — | 115 | — | — | — | — | — |

| Ex. No. | \multicolumn{8}{c}{Water Soluble resin (parts)} | H₂O parts | TiO₂ parts | HMMM parts | BI parts |
|---|---|---|---|---|---|---|---|---|---|---|---|---|
| | (1) | (2) | (3) | (4) | (5) | (6) | (7) | (8) | | | | |
| 18 | — | 486 | — | — | — | — | — | — | 40 | — | 17 | — |
| 19 | — | — | — | 281 | — | — | — | — | 45 | 146 | 17 | — |
| 20 | — | — | — | — | — | — | 450 | — | 30 | — | — | 17 |
| 21 | — | — | — | — | — | 338 | — | — | 10 | — | 25 | — |
| 22 | — | — | — | 225 | — | — | — | — | 30 | — | 17 | — |
| 23 | — | — | — | — | 300 | — | — | — | 45 | 150 | 25 | — |
| 24 | — | — | — | — | 200 | — | — | — | 40 | 150 | 17 | — |
| 25 | — | — | 257 | — | — | — | — | — | 45 | 144 | 17 | — |
| 26 | — | — | — | — | — | — | 540 | — | 20 | 150 | 25 | — |
| 27 | 375 | — | — | — | — | — | — | — | 60 | 146 | 17 | — |
| 28 | — | 243 | — | — | — | — | — | — | 50 | 144 | — | 25 |
| Comparative examples No. | | | | | | | | | | | | |
| 6 | — | — | — | — | — | — | — | 365 | 60 | 146 | 17 | — |
| 7 | — | — | — | — | 300 | — | — | — | — | — | 25 | — |
| 8 | 180 | — | — | — | — | — | — | — | — | 146 | 310 | — |
| 9 | — | 486 | — | — | — | — | — | — | — | — | 17 | — |
| 10 | — | — | — | 225 | — | — | — | — | 80 | — | 17 | — |

TABLE 6

| coating composition | working properties | gloss | water resistance | solvent resistance |
|---|---|---|---|---|
| Example | | | | |
| 18 | ○ | 78 | ○ | ○ |
| 19 | ◉ | 85 | ○ | ○ |
| 20 | ○-◉ | 79 | ○ | ○ |
| 21 | ○ | 91 | ○ | ○ |
| 22 | ◉ | 90 | ○ | ○ |
| 23 | ○-◉ | 92 | ○ | ○ |
| 24 | ◉ | 85 | ○ | ○ |
| 25 | ○-◉ | 76 | ○ | ○ |
| 26 | ○ | 75 | ○ | ○ |
| 27 | ○-◉ | 87 | ○ | ○ |
| 28 | ○ | 76 | ○ | ○ |
| Comparative example | | | | |
| 6 | X | 52 | Δ | Δ |
| 7 | ○ | 59 | X | X |
| 8 | Δ | 51 | X | Δ |
| 9 | X | 77 | X | Δ |
| 10 | X | 80 | | Δ |

Solvent resistance
 no change
Δ slight loss of gloss
X severe loss of gloss - peeling

EXAMPLE 31

Preparation of coating paste

| | |
|---|---|
| Water soluble resin (1)[1] | 300 parts |
| Resin fine powder (25)[2] | 70 parts |
| Rutile type titanium dioxide | 140 parts |
| Deionized water | 90 parts |

[1] maleic polybutadiene resin varnish already shown in EXAMPLE 1 as water soluble resin (1)
[2] Finedic M-6102 and rutile type titanium dioxide in an amount of 9.5 wt % were mixed together to form fine powder (25)

The above said compound was placed in a 1 liter stainless steel vessel and stirred well at a room temperature for 30 minutes by using a paint conditioner to obtain a white colored coating paste (1).

| Powder No. | composition |
|---|---|
| 26 | M-6107 |
| 27 | RD-6380 |
| 28 | Ep-1004 |
| 29 | Ep-1007 |
| 30 | UM-8400, vinyl acetate modified polyethylene resin manufactured by Ube Kosan K. K. |
| 31 | Nylon-12. Nylon resin manufactured by Yunichika K. K. |
| 32 | Tafbrene AP, styrene-butadiene-styrene block copolymer manufactured by Asahi Kasei K. K. |
| 33 | Dow Polyethylene XO-2375,33, acrylic acid modified polyethylene resin manufactured by Dow Chem. Co., Tm 90° C. |
| 34 | Super-chlon 510, chlorinated polypropylene resin manufactured by Kokusaku Pulp K. K., Tm 120° C. |

TABLE 7

| Example No. | Water Soluble resin (parts) | | | | | | | |
|---|---|---|---|---|---|---|---|---|
| | (1) | (2) | (3) | (4) | (5) | (6) | (7) | (8) |
| 32 | — | 486 | — | — | — | — | — | — |
| 33 | — | — | 257 | — | — | — | — | — |
| 34 | — | — | — | 281 | — | — | — | — |
| 35 | — | — | — | — | 300 | — | — | — |
| 36 | — | — | — | — | — | 338 | — | — |
| 37 | — | — | — | — | — | — | 450 | — |
| 38 | — | — | — | 300 | — | — | — | — |
| 39 | 300 | — | — | — | — | — | — | — |
| 40 | — | — | — | — | — | 375 | — | — |
| 41 | — | — | 200 | — | — | — | — | — |
| Comparative examples No. | | | | | | | | |
| 11 | — | — | — | — | — | — | — | 281 |
| 12 | — | — | — | — | — | — | — | 300 |

| Example No. | Resinous fine powder (parts) | | | | | | | | | | H$_2$O parts | TiO$_2$ parts | HMMM parts | BI parts |
|---|---|---|---|---|---|---|---|---|---|---|---|---|---|---|
| | (25) | (26) | (27) | (28) | (29) | (30) | (31) | (32) | (33) | (34) | | | | |
| 32 | — | 120 | — | — | — | — | — | — | — | — | 100 | 130 | 17 | — |
| 33 | 60 | — | — | — | — | — | — | — | — | — | 70 | 144 | 17 | — |
| 34 | — | — | 38 | — | — | — | — | — | — | — | 45 | 100 | 17 | — |
| 35 | — | — | — | — | 15 | — | — | — | — | — | 70 | 150 | 25 | — |
| 36 | — | — | — | 15 | — | — | — | — | — | — | 30 | 140 | 25 | — |
| 37 | — | — | — | — | — | 38 | — | — | — | — | 30 | 120 | — | 17 |
| 38 | — | — | — | — | — | — | 14 | — | — | — | 40 | 100 | 17 | — |
| 39 | — | — | — | — | — | — | — | 66 | — | — | 50 | 100 | 20 | — |
| 40 | — | — | — | — | — | — | — | — | 55 | — | 60 | 150 | 25 | — |
| 41 | — | — | — | — | — | — | — | — | — | 33 | 40 | 85 | 15 | — |
| Comparative examples No. | | | | | | | | | | | | | | |
| 11 | — | — | 38 | — | — | — | — | — | — | — | 45 | 100 | 17 | — |
| 12 | — | — | — | — | — | — | 14 | — | — | — | 40 | 100 | 17 | — |

Preparation of coating composition

To a 1 liter stainless steel vessel, were added 400 parts of said coating paste (1) and 25 parts of HMMM, and the content was stirred well at a room temperature for 15 minutes by using a laboratory mixer to obtain a white colored coating composition. After being left to stand at a room temperature for 2 months, the dispersion stability was examined. There was no sedimentation and separation of solid matters.

EXAMPLES 32 to 41 and COMPARATIVE EXAMPLES 11 to 12

Coating pastes and coating compositions were prepared with the raw materials listed in Table 7, following the procedures of EXAMPLE 31.

In the Table, the used resinous fine powders are as follows:

Each of the coating compositions obtained in Examples 32 to 41 did not form, after being stored at room temperatures for 2 months, any hard cakes and thus, showed excellent dispersion stability. However, the coating compositions of Comparative Examples 11 and 12 showed sedimentation and separation of solid matters in one week. Stirring was useless to restore the original dispersion.

EXAMPLE 42

The coating composition obtained in EXAMPLE 31 was applied onto a dull steel plate so as to give 30μ dry thickness, and after setting for 30 minutes, the coating was heat-dried to obtain a three-dimensionally cross-linked film. This had a flat surface and 60° C. gloss of 80. No change was observed in the film after dipping in warm water (40° C.) for 240 hours and even after dipping in coating thinner for 1 hour. The minimum film thickness showing no pinholes was 45μ and the thickness giving no sagging was 47μ.

EXAMPLE 43

A series of baked dry coatings were prepared as in Example 42 with the coating compositions of Examples 32 to 41 and Comparative Examples 11 and 12. The working properties and film performance for the respective composition are shown in Table 8.

TABLE 8

| coating composition | working properties | gloss | water resistance | bending resistance |
|---|---|---|---|---|
| Example | | | | |
| 32 | ○ | 81 | ○ | ○ |
| 33 | ○–◉ | 78 | ○ | ○ |
| 34 | ◉ | 86 | ○ | ○ |
| 35 | ○–◉ | 92 | ○ | ○ |
| 36 | ○ | 92 | ○ | ○ |
| 37 | ○–◉ | 80 | ○ | ○ |
| 38 | ○ | 85 | ○ | ○ |
| 39 | ◉ | 81 | ○ | ○ |
| 40 | ◉ | 89 | ○ | ○ |
| 41 | ◉ | 92 | ○ | ○ |
| Comparative example | | | | |
| 11 | | 60 | Δ | X –Δ |
| 12 | | 55 | Δ | X –Δ |

Bending resistance
○ no change
Δ partial peeling
X complete peeling or film destruction Bending resistance was determined by bending the coated steel plate, while pushing against the desk corner, by hand and observing the film condition with naked eyes.

What is claimed is:

1. An aqueous coating composition consisting essentially of a water medium and, as film-forming components, at least one water soluble resin and at least one water-insoluble finely pulverized resin, the weight ratio, in terms of solid matter, of said water soluble resin to said water-insoluble resin being 98:2–45:55, and at least one of said water soluble resins fulfilling the requirements that the water tolerance, expressed in terms of the water dilution multiplicand of the resin for the solution, which is incapable of reading out a defined type, is more than 4, said water tolerance being measured by a test wherein 5 g of aqueous varnish having a normal viscosity as employed in the manufacture of coating compositions, are weighed in a 100 ml beaker, and mixed together, with an increasing amount of deionized water being added thereto and then a No. 1 type, 26 point type, is read through the beaker, to determine said water tolerance, and wherein the surface tension of a 1 wt. % aqueous solution is less than 51 dyne/cm, said water soluble resin being selected from the group consisting of an alkyd resin, a polyester resin, an acrylic resin, an epoxy resin, a maleic oil resin, a maleic polyalkadiene resin, a urethane resin, and an aminoplast resin, said water soluble resin having an average molecular weight of 500 to 20,000 and wherein said water soluble resin contains 0.3 to 5 m mol/g of hydrophilic functional groups in its structure which hydrophilic groups are neutralized with either an acid or basic solubilizing compound; and wherein the finely pulverized water-insoluble resin is selected from the group consisting of an epoxy resin, a polyester resin, an acrylic resin, an alkyd resin, an oil-free alkyd resin, a phenol resin, a polyether resin, a polyalkadiene resin, a vinyl resin, a polyamide resin, a polycarbonate resin, a fluorine resin, and an aminoplast resin, said finely pulverized water-insoluble resin having a softening point of 5° to 120° C. and wherein the mean diameter of the resin particles is in the range of 0.5 to 500μ.

2. The coating composition of claim 1 wherein the softening point of the pulverized water-insoluble resin is 40° to 80° C. and the weight ratio, in terms of solid matter, of the water soluble resin to the pulverized water-insoluble resin is 80:20–50:50.

3. The coating composition of claim 1, wherein at least two functional groups capable of reacting with each other at an elevated temperature are located on at least two of the resins contained in the coating composition.

4. The coating composition of claim 1, wherein the finely pulverized water-insoluble resin contains a polyfunctional low molecular compound selected from the group consisting of a block isocyanate, an acid anhydride, an imidazole, a dicyandiamide, and a polycarboxylic acid.

5. The coating composition of claim 1, wherein the water medium contains a polar organic solvent.

6. The coating composition of claim 1, wherein the total solid content is in a range between 1 and 90% by weight of the composition.

* * * * *